United States Patent [19]

Wingrave

[11] 4,316,976

[45] Feb. 23, 1982

[54] PREPARATION OF POLYVINYL HALIDE WITH QUATERNARY SALT OF CELLULOSE SULFATE

[75] Inventor: James A. Wingrave, Ponca City, Okla.

[73] Assignee: Conoco Inc., Ponca City, Okla.

[21] Appl. No.: 215,286

[22] Filed: Dec. 11, 1980

[51] Int. Cl.$^3$ .......................... C08F 2/20; C08F 14/06
[52] U.S. Cl. .................................. 526/200; 526/344.2
[58] Field of Search ............................. 526/200, 344.2

[56] References Cited

U.S. PATENT DOCUMENTS

| | | | |
|---|---|---|---|
| 2,932,629 | 4/1960 | Wiley | 526/200 X |
| 3,205,204 | 9/1965 | Heckmaier | 526/200 |
| 4,208,499 | 6/1980 | Maruhashi | 526/202 |
| 4,226,748 | 10/1980 | Matsunaga | 526/910 X |

*Primary Examiner*—C. A. Henderson
*Attorney, Agent, or Firm*—Bayless E. Rutherford, Jr.

[57] ABSTRACT

An improved method for preparing polyvinyl halide by suspension polymerization is disclosed. The improvement comprises adding a minor, but effective, amount of a quaternary ammonium salt of cellulose sulfate to the reaction admixture prior to polymerization. The improved process results in a product having increased bulk density.

3 Claims, No Drawings

PREPARATION OF POLYVINYL HALIDE WITH QUATERNARY SALT OF CELLULOSE SULFATE

FIELD OF THE INVENTION

The invention is in the general field of preparing polyvinyl halide having improved bulk density by the suspension polymerization of vinyl halide monomer.

BACKGROUND OF THE INVENTION

Polyvinyl chloride is a very useful commercial material, in that many useful commercial articles of manufacture can be prepared from it. One of the more common methods of preparing articles such as rods, channels, tubing and hose from polyvinyl chloride involves the use of an extruder. It is well-recognized in the art that polyvinyl chloride having an increased bulk density increases the extrusion rate and thereby increases the output of the extruder.

My invention is directed to an improved process of preparing polyvinyl chloride, and other polyvinyl halides, which results in a product having an increased bulk density.

BRIEF SUMMARY OF THE INVENTION

Briefly stated, the present invention is directed to an improved process for preparing polyvinyl halides by suspension polymerization of a vinyl halide monomer wherein the improvement comprises adding a minor, but effective, amount of a quaternary ammonium salt of cellulose sulfate to the reaction admixture prior to polymerization, said improved process resulting in a product having increased bulk density.

In one aspect the invention is directed to the product prepared by the above-described process.

DETAILED DESCRIPTION

The vinyl halide used in my invention preferably is vinyl chloride. However, other vinyl halides, such as vinyl bromide and vinyl fluoride, can be used. The invention will be illustrated using vinyl chloride.

The preparation of polyvinyl chloride by suspension polymerization is well-known. Because of this it is not necessary to provide a detailed description of the process. However, in order to provide a more complete teaching the following information is provided.

Any of the initiators ordinarily used in the suspension polymerization of vinyl chloride can be used in my process. Examples of suitable initiators include organic peroxides such as benzoyl peroxide, lauroyl peroxide and diisopropyl peroxydicarbonate; azo compounds such as azobisisobutylronitrile; and the like oil-soluble catalysts.

Also, any of the suspending agents normally used in the suspension polymerization of vinyl chloride can be used in my process. Examples of suitable suspending agents include natural high molecular substances such as starch and gelatin, and synthetic high molecular substances such as partially saponified polyvinyl alcohol, methyl cellulose, ethyl cellulose, hydroxypropoxymethyl cellulose, maleic anhydride-vinyl ether copolymer and polyvinyl pyrrolidine and the like.

Inasmuch as there are many references (patents, books, encyclopedias, etc.) which teach the amounts of water, monomer, initiator and suspending agent, which are used in suspension polymerization processes, it is not believed necessary to describe suitable amounts herein.

The salient feature of my process is the addition of a minor amount of a quaternary ammonium salt of cellulose sulfate to the polymerization recipe prior to polymerization.

The quaternary ammonium cellulose sulfate salts are prepared by means known to those skilled in the art, such as disclosed, for instance, in U.S. Pat. No. 3,726,796, issued Apr. 10, 1973, to Schweiger and assigned to Kelco Company. U.S. Pat. No. 3,726,796 is hereby incorporated by reference.

The quaternary ammonium cellulose sulfate salts are derivatives of a colloidal cellulose sulfate having a degree of substitution (D.S.) of at least about 2, e.g., such as 1.8; having a viscosity in excess of 20 cps at a one percent concentration in an aqueous media as measured by a Brookfield Synchro-Lectric Viscometer, Model LVF, at 60 rpm and a temperature of 25° C. and being further characterized as reactive with potassium ions in aqueous media to form a thermoreversible gel. The quaternary ammonium salt which is reacted with the colloidal cellulose sulfate contains four organic radicals attached to the nitrogen atom. The number of carbon atoms present in all of the organic substituent groups should total about 16 or more in order to impart suitable solubility characteristics to the resulting quaternary ammonium salt of the cellulose sulfate.

The reaction to form the quaternary ammonium cellulose sulfate salt is conducted in the presence of water, and there is optionally present a lower alcohol. A preferred lower alcohol is methanol since it is quite miscible with water and is cheap and readily available. The reaction is generally conducted by dissolving in water, preferably at a pH of about 7 or higher, a water-soluble salt of the colloidal cellulose sulfate after which there is optionally added a lower alcohol followed by the addition of a quaternary ammonium salt. The reaction may be conducted at room temperature or higher temperatures such as about 50° C. to 70° C. and preferably with agitation of the reaction mixture. The reaction goes almost instantaneously to give a nearly quantitative yield of the quaternary ammonium derivative of the colloidal cellulose sulfate. The product precipitates from the mother liquor and is removed and is then washed and dried.

The colloidal cellulose sulfate reactant used in the reaction may be a water-soluble salt of cellulose sulfate, such as the sodium, ammonium, lithium, or potassium salt. The nature of the ion, such as sodium, which is present in the cellulose sulfate starting material can, of course, be varied so long as the cellulose sulfate salt is water soluble. The quaternary ammonium reactant is preferably a halogen salt, such as a chloride, bromide, or an iodide.

If desired, the quaternary ammonium salts of the colloidal cellulose sulfate may be formed by reaction of the free sulfuric acid ester of the colloidal cellulose sulfate rather than reaction of a water-soluble salt thereof. When the cellulose sulfate reactant is in the form of the free sulfuric acid ester, the quaternary ammonium ion is supplied by use of the corresponding quaternary ammonium hydroxide as a reactant.

Preferably, the quaternary ammonium salt or quaternary ammonium base, as the case may be, is employed in slight excess in forming the quaternary ammonium salt of a colloidal cellulose sulfate as described above. A molar excess of quaternary ammonium reactant of 0.1 to 0.3 or greater has a tendency to drive the reaction to essential completion. This is desirable because the colloidal cellulose sulfate is the more expensive of the reactants. Completion of the reaction can be readily determined by visual observation of the mother liquor. As the quaternary ammonium cellulose sulfate product is formed, it coagulates and leaves the solution such that the remaining mother liquor becomes nearly clear and loses that portion of its viscosity which was contributed to it by the cellulose sulfate reactant. Further, the use of a slight molar excess of the quaternary ammonium reactant, e.g., 0.1 to 0.3, has, in general, been found to improve the solubility characteristics of the resulting products in a hydrocarbon oil as employed in the present invention.

The colloidal cellulose sulfate is prepared by reaction of cellulose with a complex of sulfur trioxide and a lower N-dialkyl amide. The cellulose is presoaked prior to the sulfation reaction by the addition thereto of at least an equal weight of the same lower N-dialkyl amide. Preferably the N-dialkyl amide is dimethyl formamide, although there may also be used diethyl formamide, dimethyl acetamide, diethyl acetamide, and dimethyl propionamide. An excess of the N-dialkyl amide is preferably present in the sulfation complex in addition to the premixing of the cellulose with at least an equal amount by weight of the N-dialkyl amide used in preparing the complex.

In forming the essentially undegraded colloidal cellulose sulfate, the sulfation complex which contains sulfur trioxide and a lower N-dialkyl amide at a weight ratio of about 1 to 1 should be present in the reaction mixture in an amount which is about 1 to 8 times the weight of the cellulose. The term "cellulose" includes cellulose derived from various sources and in various forms, such as chemically treated cotton linters, cellulose derived from wood, etc.

In reaction of the sulfation complex with cellulose, as described above, a reaction temperature of about 0° C. to about 25° C. is suitable, and preferably the sulfation reaction is conducted at a temperature below about 15° C. The reaction time for relatively complete esterification can range from less than 1 hour up to several hours, depending upon the reaction temperature and the relative concentrations of the reactants.

One category of quaternary ammonium cellulose sulfate compounds which can be used in my invention is denoted (I) in which there are two long chains, i.e. from about $C_{10}$ to about $C_{18}$, alkyl groups attached to the nitrogen atom in addition to two methyl groups. Examples of such quaternary ammonium cellulose sulfates are dimethyl dilauryl ammonium cellulose sulfate, dimethyl distearyl ammonium cellulose sulfate, and compounds containing mixed long-chain alkyl groups, such as dimethyl di(mixed palmityl, myristyl, and stearyl) ammonium cellulose sulfate which may also be called dimethyl di(hydrogenated tallow) ammonium cellulose sulfate. Still another example of a di(mixed alkyl) dimethyl ammonium cellulose sulfate is dimethyl di(tallow) ammonium cellulose sulfate in which the mixed long-chain alkyl groups contain some degree of unsaturation.

A secondary category (II) of quaternary ammonium cellulose sulfates are those in which three methyl groups are bonded to the nitrogen atom, together with one long-chain alkyl group, i.e., about $C_{14}$ to $C_{18}$.

Typical of such products are trimethyl tallow ammonium cellulose sulfate, trimethyl hydrogenated tallow ammonium cellulose sulfate, trimethyl stearyl ammonium cellulose sulfate, and trimethyl tall oil ammonium cellulose sulfate.

Still other categories of quaternary ammonium cellulose sulfates are (III) dimethyl monoalkyl (about $C_{12}$–$C_{18}$) monoaromatic ammonium cellulose sulfates; (IV) diaromatic monoalkyl (about $C_{12}$–$C_{18}$) methyl ammonium cellulose sulfates, and (V) methyl trialkyl (about $C_8$–$C_{18}$) ammonium cellulose sulfates. An example of a product in category (III) is dimethyl phenyl stearyl ammonium cellulose sulfate, while an example of a material in category (VI) is methyl tricaprylyl ammonium cellulose sulfate. Of the quaternary ammonium cellulose sulfates defined above, the materials in categories (I), (IV), and (V) are preferred for use in the present invention.

The aromatic groups present in the compounds denoted (IV) above are monocyclic aromatic hydrocarbon groups containing from 6 to about 18 carbon atoms. Typical of such groups are phenyl, stearylphenyl, laurylphenyl, and dimethylphenyl groups.

The amount of quaternary ammonium salt of cellulose sulfate which is used in my invention is shown below, as parts per hundred parts of monomer.

| Suitable | Preferred |
|---|---|
| 0.005 to 1.0 | 0.02 to 0.20 |

The process is conducted at a temperature in the range of about 38° to about 71° C., more usually in the range of about 49° to about 66° C. As is well-known in the art the reaction occurs at an increased pressure.

When the reaction nears completion, the pressure in the reactor begins to drop. At this point and while the reaction admixture is at or near the maximum temperature, stripping is begun. "Stripping" is wellknown to those skilled in this art. Usually, it means venting the vapors, which contain unreacted monomer, to a collecting vessel. The pressure on the reaction vessel is allowed to go to atmospheric. In many instances, the stripping is extended by applying a vacuum to the reactor containing the slurry.

The slurry is then passed to another vessel. If desired, it can be subjected to steam stripping, or other treatment, to remove additional unreacted vinyl halide. It is then processed by conventional means. For example, the water is removed by filtration, after which the polymer is dried.

In order to illustrate the nature of the present invention still more clearly the following examples will be given. It is to be understood, however, that the invention is not to be limited to the specific conditions or details set forth in these examples except insofar as such limitations are specified in the appended claims.

A control run and two runs containing the quaternary ammonium salt of cellulose sulfate were made. The runs were made in a 15-gallon reactor.

The formulation used was as follows.
| | |
|---|---|
| Deionized water | 62 lbs |
| Suspending agent[1] | 667 grams |
| Initiator[2] | 18.5 grams |
| Vinyl chloride monomer | 38 lbs |
| Quaternary ammonium salt of cellu- | |

-continued

| lose sulfate[4] | (3) |
|---|---|

[1]hydroxypropoxymethyl cellulose
[2]peroxydicarbonate
[3]Varied - 0, 0.02 and 0.10 parts per hundred parts of vinyl chloride
[4]"Kelco Soloid" (a trademark of Kelco Company, San Diego, California)

The polymerization procedure were as follows.

(a) added deionized water, suspending agent and initiator to the reactor (b) added none (control) or designated amount of quaternary ammonium salt to the reactor (c) sealed reactor and evacuated for 15 minutes (d) added vinyl chloride monomer to reactor (e) started agitator and agitated reaction contents for 30 minutes (f) heated reactor and contents to 57° C.

(g) the polymerization reaction was continued until the pressure dropped to 90 psig, at which time the reactor was vented (h) the resin was recovered using standard procedures.

The polymerization time was the elapsed time between the heat-up (step b) and venting (step g).

The particle size and bulk density were determined on the products of the various runs using the following procedures.

A. Particle Size

The particle size sieve analysis was the weight of resin residing on the designated sieves after the following mixture had been subjected to 30 minutes in a Ro Tap apparatus:

| ·PVC Resin | 100.0g |
|---|---|
| Antistatic Agent | 2.0g |

B. Bulk Density

The bulk density analysis was determined from the mass of the above-described mixture which flowed into a 100 ml beaker from a funnel supported two inches above the beaker lift. The mass determined in this manner was multiplied by 0.6248 to give bulk density in units of lb/ft$^3$.

The results of the three runs are shown in the following table.

TABLE

| Run No. | Amount of Quaternary Compound (phm) | Bulk Density (lb/ft$^3$) | Poly* Time (hr: min) | Particle Size | | | | | | |
|---|---|---|---|---|---|---|---|---|---|---|
| | | | | 40 | 60 | 80 | 100 | 140 | 200 | Pan |
| A | None | 32.0 | 4:55 | 5 | 18 | 42 | 14 | 14 | 4 | 3 |
| B | 0.02 | 33.7 | 5:00 | 8 | 8 | 42 | 16 | 18 | 5 | 3 |
| C | 0.10 | 35.1 | 8:41 | 24 | 18 | 30 | 9 | 12 | 4 | 3 |

*Polymerization

Thus, having described the invention in detail, it will be understood by those skilled in the art that certain variations and modifications may be made without departing from the spirit and scope of the invention as defined herein and in the appended claims.

I claim:

1. An improved process for preparing polyvinyl chloride by suspension polymerization of vinyl chloride monomer, said process resulting in a product having improved bulk density, said improvement comprising adding an effective amount, in the range of about 0.005 to about 1.0 part per 100 parts of vinyl chloride monomer, to the reaction admixture prior to polymerization, of a quaternary ammonium salt of cellulose sulfate, the quaternary ammonium group of said quaternary ammonium salt of cellulose sulfate containing at least 16 carbon atoms and said cellulose sulfate is characterized as follows:

(a) is an undegraded cellulose sulfate,
(b) has a degree of substitution of about 2.0 or higher,
(c) has a viscosity of 20 cps or higher at 1.0 weight percent concentration in an aqueous media as measured by a Brookfield Synchro-Lectric Viscometer, Model LVF at 60 rpm and a temperature of 25° C., and
(d) is further characterized as reactive with potassium ions to form a thermoreversible gel.

2. The improved process of claim 1 wherein said quaternary ammonium portion of said quaternary salt contains:

(a) two long-chain alkyl groups each having from about 10 to about 18 carbon atoms and two methyl groups;
(b) three methyl groups together with one long-chain alkyl group having 14 to 18 carbon atoms;
(c) two methyl groups, one alkyl group having 12–18 carbon atoms and one monocyclic aromatic hydrocarbon group having 6 to 18 carbon atoms;
(d) two monocyclic aromatic hydrocarbon groups with each of said aromatic groups containing from 6 to 18 carbon atoms, one alkyl group having 12–18 carbon atoms and one methyl group; or
(e) one methyl group and three long-chain alkyl groups with each of said alkyl groups containing from 8 to about 18 carbon atoms.

3. The improved process of claims 1 or 2 wherein the amount of quaternary ammonium salt of cellulose sulfate is in the range of about 0.02 to about 0.20 parts per 100 parts of vinyl chloride monomer.

* * * * *